(12) United States Patent
Raboin

(10) Patent No.: US 11,040,322 B2
(45) Date of Patent: Jun. 22, 2021

(54) CERAMIC INJECTOR FOR FLUID CATALYTIC CRACKING UNIT

(71) Applicant: Total Raffinage Chimie, Courbevoie (FR)

(72) Inventor: Jean-Christophe Raboin, Chaumont sur Tharonne (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 16/751,446

(22) Filed: Jan. 24, 2020

(65) Prior Publication Data

US 2020/0156034 A1 May 21, 2020

Related U.S. Application Data

(62) Division of application No. 15/326,613, filed as application No. PCT/EP2015/066897 on Jul. 23, 2015, now Pat. No. 10,576,441.

(30) Foreign Application Priority Data

Jul. 28, 2014 (FR) ...................................... 1457253

(51) Int. Cl.
| | |
|---|---|
| *B01J 8/18* | (2006.01) |
| *B01J 19/02* | (2006.01) |
| *C10G 11/18* | (2006.01) |
| *C04B 35/628* | (2006.01) |
| *C04B 35/64* | (2006.01) |
| *C04B 35/80* | (2006.01) |

(52) U.S. Cl.
CPC ............. *B01J 8/1827* (2013.01); *B01J 19/02* (2013.01); *C04B 35/62844* (2013.01); *C04B 35/64* (2013.01); *C04B 35/80* (2013.01); *C10G 11/18* (2013.01); *B01J 2208/00902* (2013.01)

(58) Field of Classification Search
CPC ...................... B01J 8/1827; B01J 19/02; B01J 2208/00902; C04B 35/62844; C04B 35/64; C04B 35/80; C10G 11/18
See application file for complete search history.

(56) References Cited

U.S. PATENT DOCUMENTS 4,875,996 A * 10/1989 Hsieh .......................... B01J 8/18
208/157
5,948,241 A * 9/1999 Owen ...................... B01J 19/26
208/113

* cited by examiner

*Primary Examiner* — Randy Boyer
*Assistant Examiner* — Juan C Valencia
(74) *Attorney, Agent, or Firm* — Albert Shung

(57) ABSTRACT

The invention relates to a feedstock injector (2') for injecting an atomized hydrocarbon feedstock into a tubular-type reactor with substantially upward or downward flow that is intended to be used in a fluid catalytic cracking unit, having: at least one hollow cylindrical body (41); at least a first and a second inlet openings (40, 42) for respectively injecting a liquid hydrocarbon feedstock to be cracked and an atomizing gas into said cylindrical body (41); at least one contact chamber (46) arranged inside said hollow cylindrical body, in which said liquid hydrocarbon feedstock to be cracked and said atomizing gas are intended to be brought into contact in order to atomize said liquid hydrocarbon feedstock to be cracked; and at least one outlet opening (44) that opens on the inside of said reactor in order to eject said liquid hydrocarbon feedstock thus atomized. According to the invention, each element of the injector (2') is formed of a ceramic material.

11 Claims, 2 Drawing Sheets

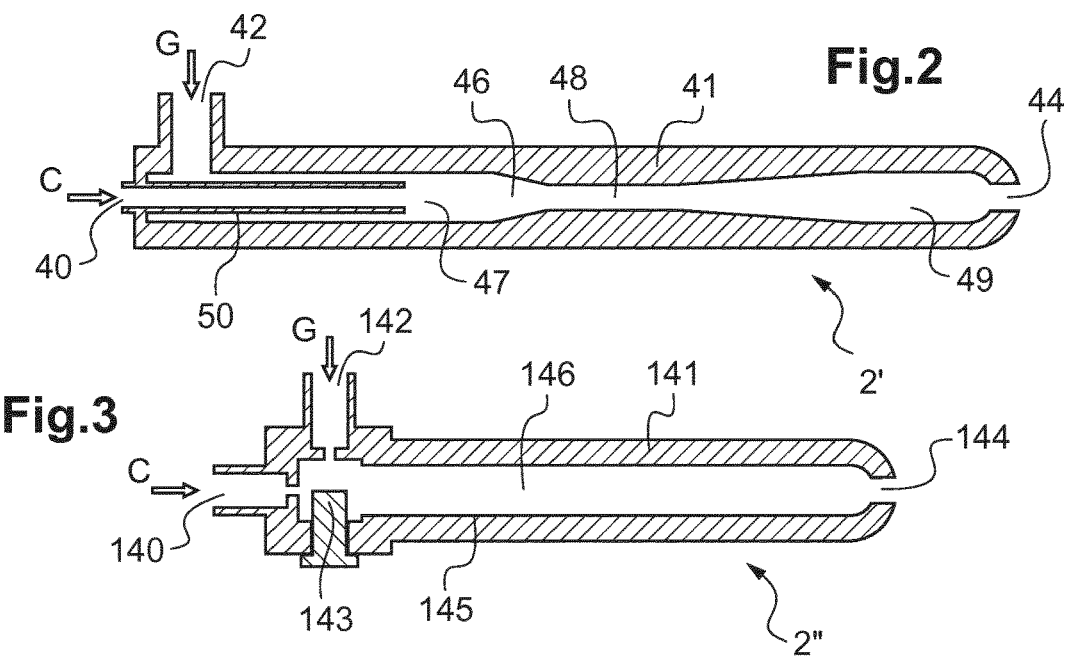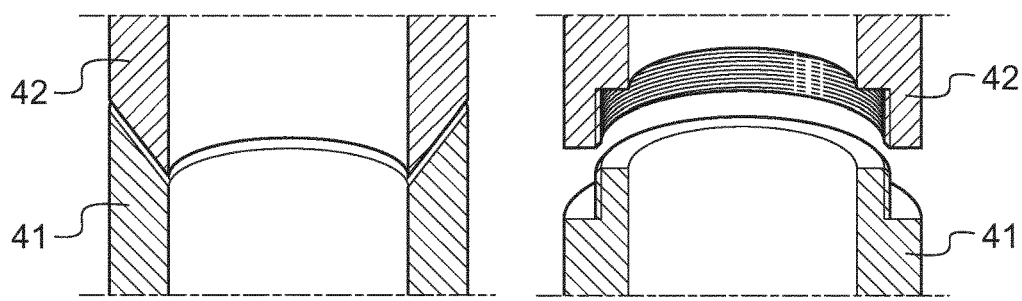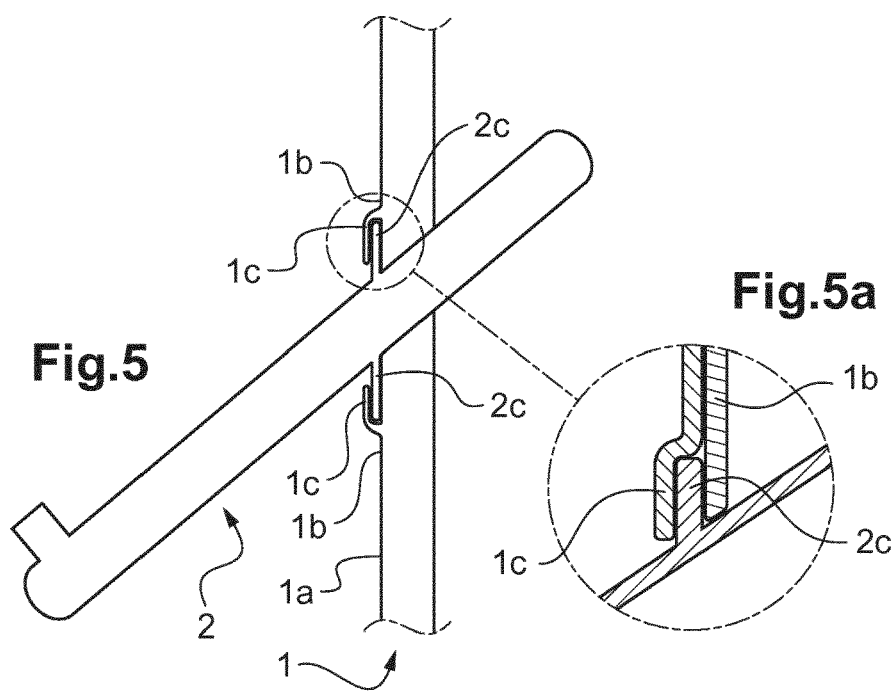

CERAMIC INJECTOR FOR FLUID CATALYTIC CRACKING UNIT

CROSS-REFERENCE TO RELATED APPLICATIONS

This application is a divisional of U.S. patent application Ser. No. 15/326,613, filed Jan. 16, 2017, which claims the benefit of PCT/EP2015/066897, filed Jul. 23, 2015, which claims priority from FR 1457253 filed Jul. 28, 2014, which are herein incorporated in their entireties for all purposes.

The present invention relates to a feedstock injector of a fluid catalytic cracking (FCC) unit.

In an FCC unit, a hydrocarbon feedstock atomized into fine droplets is injected then brought into contact, at high temperature, for example from 520° C. to 550° C., with cracking catalyst grains circulating in a reactor in the form of a dilute fluidized bed.

The reactors used are generally vertical reactors of tubular type, in which the catalyst moves following an essentially upward flow (riser reactor) or essentially downward flow (downer reactor). These reactors are generally provided with at least one injector, with the aid of which the hydrocarbon feedstock is introduced into the reactor. Before being introduced into the reactor, the hydrocarbon feedstock is atomized into fine droplets inside the injector. Although there is no real consensus regarding the optimum diameter of the droplets, in general it is sought to form droplets whose diameter is of the same order of magnitude as the diameter of the catalyst particles, namely less than 200 microns, for example of the order of 70 to 80 microns.

This step of atomization of the feedstock by the injectors is particularly important since it makes it possible to maximize the liquid (liquid hydrocarbon feedstock)-solid (catalyst) contact area, which promotes the heat transfer and contributes to the homogeneous distribution of the hydrocarbons within the riser or downer reactor.

Generally, use is made of "two-phase" injectors, which have a hollow cylindrical body and two inlet openings through which the liquid hydrocarbon feedstock to be cracked and an atomizing gas, generally steam, are respectively injected into said body. A contact chamber is arranged inside the body, in which the hydrocarbon feedstock and the atomizing gas are brought into contact in order to atomize the hydrocarbon feedstock. Once atomized, the hydrocarbon feedstock is ejected via an outlet opening that opens into the reactor. Each injector is inserted in a reactor wall so that one end of the injector comprising the outlet opening is located inside the reactor.

The injector is subject, on the one hand, to a corrosion induced by the steam and by the hydrocarbon feedstock passing through the inside of the body of the injector, and on the other hand to an external erosion induced by the circulation of the catalyst inside the reactor.

In order to solve this problem, an injector made of special steels has been proposed, the end of which located inside the reactor is optionally coated with a layer of ceramic having a thickness of several hundreds of microns. Although the injectors thus obtained display a better resistance, this technique does not allow prolonged use of the injectors without maintenance or regular replacement owing to the substantial abrasion caused by the stream of catalyst passing in contact with the outer surface of the feedstock injector, inside the reactor. Once the ceramic layer is ablated, the erosion of the steel is very rapid, leading to a substantial deterioration in the performance of the injector.

Furthermore, the materials used for the manufacture of the injectors also limit the possible choice of the atomizing gas since the latter must not induce significant corrosion of the material of the injector. This is the reason why steam is commonly used as atomizing gas. However, the oxygen atoms contained in the steam have a tendency to react with the hydrocarbon feedstock or with the products of the cracking reaction, which may result in the formation of oxygen-containing compounds, which are difficult to remove from the desired hydrocarbon product and are not very reusable. Moreover, these oxygen-containing compounds may cause a deactivation of the catalysts used during subsequent treatment operations of the products obtained.

WO 2007/065001, U.S. Pat. Nos. 6,503,461, 5,061,457 and 4,875,996 describe feedstock injectors, the end of which in contact with the catalyst stream in the reaction zone comprises a ceramic element. However, the injectors described do not make it possible to avoid a degradation of their performance in service. This degradation does not appear to be linked to the ceramic head, for which no significant structural modification is observed.

Consequently, a problem that is faced and that the present invention aims to solve is not only that of providing an injector that is resistant to erosion and corrosion and that requires less maintenance, but also that of providing hydrocarbon feedstock injection means that enable a better efficiency of the FCC unit and a better quality of the products obtained, while preserving their nebulization/atomization performance over time, and this being irrespective of the gas used for nebulizing/atomizing the feedstock.

For this purpose, the present invention proposes a feedstock injector for injecting a hydrocarbon feedstock into a tubular-type reactor with substantially upward or downward flow that is intended to be used in a fluid catalytic cracking unit, having at least one hollow cylindrical body, at least a first and a second inlet openings for respectively injecting a liquid hydrocarbon feedstock to be cracked and an atomizing gas into said hollow cylindrical body, at least one contact chamber arranged inside said hollow cylindrical body, in which said liquid hydrocarbon feedstock to be cracked and said atomizing gas are intended to be brought into contact in order to atomize said liquid hydrocarbon feedstock to be cracked, and at least one outlet opening in order to eject said liquid hydrocarbon feedstock thus atomized, characterized in that each element of the injector is formed of ceramic material.

Thus, one feature of the invention lies in the fact that the injector is mainly manufactured from a ceramic material. The injector according to the invention has the advantage of being made of ceramic, at least as regards its main elements, namely the hollow cylindrical body, the inlet opening for the atomizing gas, the inlet opening for the liquid hydrocarbon feedstock to be cracked and the contact chamber. Ceramic materials have proved suitable for the usage conditions of an FCC unit. In particular, these materials may have good corrosion resistance and thermal resistance. Ceramic materials have a relatively high hardness, greater than the catalysts used in the FCC unit, namely a hardness of at least 1400 N/mm$^2$ as Vickers hardness. Preferably, the ceramic material has a hardness of greater than 2100 N/mm$^2$ or even greater than 2500 N/mm$^2$. Owing to this relatively high hardness, the injectors according to the invention have the advantage of not requiring the presence of a protective layer on their walls: it is thus no longer necessary to protect the walls with coatings of the type of those described above for steel walls. The result of this is a considerable weight saving of the injectors with respect to the steel injectors customarily used, and a simplified manufacture.

Furthermore, owing to the high inertia of ceramics with respect to many chemical compounds, it is possible to broaden the choice of atomizing gases. In this case, it is possible to select atomizing gases that are more reactive with the hydrocarbon products, or/and that cause only little, or no, formation of oxygen-containing compounds. By way of example, mention may be made of gases that do not comprise any oxygen atoms, such as nitrogen, helium and hydrogen sulphide $H_2S$ gases.

Without wishing to be tied to any one theory, the applicant assumes that the erosion/corrosion phenomena that take place inside conventional injectors, generally made of steel, in the zone for mixing of the feedstock and the gas carrying out the nebulization/atomization of the feedstock, would be at the root of the degradation of the nebulization/atomization performance over time, independently of the nature of the material used for manufacturing the injector head (steel or ceramic), the injector head being affected by other erosion phenomena predominantly involving the cracking catalyst.

The feedstock injector according to the invention may be a two-phase injector. By way of example, mention may be made of "Venturi" or "impactor" injectors. However, the choice of the injector is not limited as long as it produces droplets having, for example, a mean diameter of the same order as that of the catalyst particles (for example around 70-80 microns).

Preferably, the ceramic material is selected from silicon carbide SiC, boron carbide $B_4C$, silicon nitride $Si_3N_4$, aluminium nitride AlN, boron nitride BN, alumina $Al_2O_3$, or mixtures thereof. Preferably, the ceramic material is silicon carbide SiC.

Preferably, the ceramic material is silicon carbide SiC or comprises silicon carbide SiC, preferably in a majority amount, for example in a content of 60% to 99.9% by weight. Silicon carbide has the advantage of possessing good mechanical and physical properties for a reasonable manufacturing cost.

As a variant, or optionally in combination, the ceramic material comprises a ceramic matrix selected from silicon carbide SiC, boron carbide $B_4C$, silicon nitride $Si_3N_4$, aluminium nitride AlN, boron nitride BN, alumina $Al_2O_3$, or mixtures thereof, incorporated in which ceramic matrix are carbon fibres or ceramic fibres, or a mixture of these fibres.

The ceramic material is then a composite material. Such a composite material may be advantageous for the injectors subjected to stretching and shear stresses. In particular, the fibres may be positioned randomly (pseudo-isotropically) or anisotropically. An anisotropic distribution of the fibres may be advantageous in particular zones, for example the end zones intended to be assembled with another material or with another part of the same material (mechanical assembly or welding, brazing) or in the case of zones subjected to a considerable stretching/shear stress. When they are present, these fibres may represent from 0.1% to 10% by weight of the composite material.

The carbon fibres may be carbon fibres with graphite planes oriented along the fibre.

The ceramic fibres may be selected from crystalline alumina fibres, mullite ($3Al_2O_3$, $2SiO_2$) fibres, crystalline or amorphous silicon carbide fibres, zirconia fibres, silica-alumina fibres, or mixtures thereof.

Preferably, the composite ceramic material comprises a silicon carbide SiC matrix comprising fibres of the aforementioned type. Preferably, the fibres are silicon carbide fibres.

Advantageously and non-limitingly, the devices according to the invention are preferably made of CMC materials (CMC=Ceramic Matrix Composite), here identified as CMC devices. In other words, the composite material here above mentioned may be a CMC.

A method of preparation of these CMC devices is preferably performed as follows:

1) Shaping a fibrous ceramic material eventually over a supporting material that could be removed without excessive effort, in order to obtain a fibrous shape that can be assimilated to the backbone of the final device to be obtained, eventually in the presence of a first resin,
2) Coating the shape obtained at step (1) with finely divided ceramic powder and at least a second resin, eventually in the presence of finely divided carbon powder, to obtain a coated shape,
3) Eventually repeat steps (1) and (2),
4) Heating the coated shape of step (2) or (3) under vacuum and/or under inert atmosphere in order to transform the resins of step (1), (2) and eventually (3) into a carbon-rich structure, essentially deprived of other elements to obtain a carbon-rich coated shape,
5) Introducing a gas within the carbon-rich coated shape of step (4) under conditions efficient to transform the carbon-rich structure into carbide containing carbon-rich structure,
6) Eventually removing the supporting material of step (1), when present, wherein carbon fibers are present at least at step (1), (2) and/or (3) within the fibrous ceramic material, within the finely divided ceramic powder, within the finely divided carbon powder, and/or within the first and/or second resin.

Preferably, the mixture of finely divided ceramic powder comprises ceramic fibers with lengths comprised between 100 nm to 5 mm in an amount from 0.1 to 20 Wt % relative to the total amount of finely divided ceramic powder+finely divided carbon powder when present.

Preferably, the fibrous ceramic material is made of non-woven fabric, woven fabric or knit made with at least one of thread, yarn, string, filament, cord, string, bundle cable, eventually sewed to maintain the desired shape. The fibrous ceramic material and the resins can be present in an amount up to 50 wt % relative to the total amount of components. In these conditions, if a CMC is manufactured with 50 Wt % fibrous ceramic material and resins, and ceramic powder comprising 20 Wt % ceramic fibers is added, the overall content in free fibers, i.e. not contained in the fibrous ceramic material, before any thermal treatment, is 10 Wt %. (Wt %=weight percent).

The fibrous ceramic material is preferably made with carbon and/or silicon carbide fibers.

The first, second and further resin are independently selected among resins able to produce a carbon residue and to bind the different constituents of the ceramic material before thermal treatment. Suitable resins include preferably poly-methacrylic acid, poly methyl methacrylate, poly ethyl methacrylate, polymethacrylonitrile, polycarbonates, polyesters, polyolefins such as polyethylene and polypropylene, polyurethanes, polyamides, polyvinyl butyral, polyoxyethylene, phenolic resins, furfuryl alcohol resins, usual polymer precursors of carbon fibers such as polyacrylonitrile, rayon, petroleum pitch. The resins and their quantities are adjusted to the desired porosity that is obtained after thermal treatment of step (4) and before step (5). Preferably, the total porosity after treatment of step (4) should be comprised between 15 vol % and 25 vol %, more preferably between 20 vol % and 22 vol %. (Vol %=volume percent). Without wishing to be bound by theory, it is assumed the resins, when undergoing thermal treatment of step (4) transform into a network of cavities containing residual carbon atoms surrounded with voids. It is assumed the gas of step (5) moves preferentially within this network thus allowing improved homogeneity in the final CMC material. For example, 78 Wt % SiC powder which contains 0.2 Wt % of silicon carbide fiber is mixed with 17 Wt % phenolic resin and 5 Wt % poly methyl methacrylate and this mixture is used to impregnate and cover a silicon carbide fabric (which accounts for 20 Wt % of the overall weight) that surrounds a shaping support, then heated under inert gas atmosphere until complete carbonization of the resins to obtain a final product having from 16 vol % to 18 vol % total porosity.

The gas may be selected among $SiH_4$, $SiCl_4$, $ZrCl_4$, $TiCl_4$, $BCl_3$, to form corresponding carbide.

Preferred gas is $SiH_4$ or $SiCl_4$.

Preferred conditions of step (5) are standard RCVI conditions (Reactive Chemical Vapor Infiltration), more preferably using pulsed pressure.

Preferably steps (4) and (5) are each independently performed at a temperature comprised between 1100 and 1800° C. and at an absolute pressure comprised between 0.1 and 1 bar.

Preferably, the finely divided ceramic powder comprises, or eventually consists of, particles selected from silicon carbide SiC, boron carbide $B_4C$, silicon nitride $Si_3N_4$, aluminium nitride AlN, boron nitride BN, alumina $Al_2O_3$, or mixtures thereof.

Preferably, the finely divided carbon powder is carbon black.

A suitable but non limiting particle size range for the finely divided ceramic powder, and eventually finely divided carbon powder, is about 10 micrometers or less.

Such a method of preparation allows improved homogeneity in the CMC material in that porosity gradient and clogging at the surface of the material is considerably reduced or totally alleviated, depending on the experimental conditions (low temperatures ca. 1100-1300° C. and reduced pressure ca. 0.1-0.5 bar abs. are preferred).

Advantageously and non-limitingly, the ceramic material may be a sintered ceramic material. This may in particular facilitate the production of the elements made of ceramic, whether they are made from one or more portions or whether the injector is produced from a single part. With regard to the dimension of the injectors, it is possible to produce the injector according to the invention made of solid ceramic as a single part without assembling or welding. In this case, the injector may be formed for example by moulding or by extrusion, followed by a firing of the green injection element, under conventional operating conditions suitable for the type of ceramic produced. The firing step is optionally preceded by a drying step.

Advantageously, the inner and/or outer walls of the injector may be smooth, in other words they may have a low surface roughness. Such smooth walls make it possible to increase the velocities in operation inside the injector and at the outlet opening. Therefore, it is possible not only to reduce the size of the injectors but also to increase throughputs of hydrocarbon feedstock and consequently a better dispersion of the hydrocarbon feedstock which makes it possible to improve the quality of the cracking products from the hydrocarbon feedstock. Furthermore, the fact of reducing the size of the injectors makes it possible to increase the number of injectors in the fluidized bed.

Such a smooth wall may be obtained when the ceramic material is a sintered ceramic material.

Advantageously and non-limitingly, the feedstock injector may be obtained from a relatively fine sintering powder, for example having a mean grain diameter of less than or equal to 500 nm, which may result in relatively smooth surfaces.

Alternatively or in addition, the feedstock injector may be obtained by adding to the main material, for example SiC, an additive selected from boron B, silicon Si and carbon C, or mixtures thereof, for example in a proportion varying from 0.3% to 2% by weight. In the case of a SiC material obtained by powder sintering, such an addition of additive may make it possible to reduce the porosity and consequently the roughness.

Advantageously and non-limitingly, the additive may comprise a mixture of boron B, silicon Si and carbon C. Additional SiC may thus be formed, which blocks the pores and thus reduces the roughness.

Alternatively or in addition, a step of additional deposition of SiC by chemical vapour deposition (CVD) could for example be provided.

In one particular embodiment, the elements of the injector may each be made from a single part made of ceramic material, obtained by sintering. The sintering step may be preceded by a conventional shaping step, for example by compression, extrusion or injection.

Sintering is a process for manufacturing parts that consists in heating a powder without melting it. Under the effect of heat, the grains fuse together, which forms the cohesion of the part. Sintering is especially used for obtaining the densification of ceramic materials and has the following advantages:
  it makes it possible to control the density of the substance;
    as a powder is used to start with and since this powder does not melt, it is possible to control the size of the powder grains (particle size) and the density of the material, depending on the degree of initial compacting of the powders;
  it makes it possible to obtain materials having a controlled porosity, that are chemically inert (low chemical reactivity and good corrosion resistance) and thermally inert;
  it makes it possible to control the dimensions of the parts produced: as there is no change of state, the variations in volume and in dimensions are not very large with respect to melting (absence of shrinkage phenomenon).

In another particular embodiment, the elements of the injector may be separate elements made of ceramic material that are assembled together.

Furthermore, each separate element of the injector, or at least one of the separate elements of the injector, may also be formed of several portions assembled together. Each portion may in particular be obtained by sintering.

The separate elements of the injector, and/or the portions forming these elements, may be connected by welding or brazing. The assembling may for example be carried out by a diffusion welding process, for example as described in document US 2009/0239007 A1.

As a variant or in combination, separate elements of the injector to be assembled and/or portions forming these elements to be assembled may have ends shaped in order to be assembled by interlocking or screwing.

Advantageously, the ends of the portions or elements assembled by interlocking or screwing may have a conical shape, which may make it possible to simply reduce the stresses between the parts and to improve the leaktightness between the parts.

Advantageously, for better leaktightness, a seal may be positioned between the portions or elements assembled by interlocking or screwing. It may be, for example, a seal made of carbon or made of any other suitable material, for example made of vermiculite or made of another compressible and thermally stable material. Optionally, a seal may be positioned between portions or elements assembled by interlocking or screwing having a conical shape.

The injector according to the invention has the advantage of being made of ceramic material, at least as regards its main elements, namely cylindrical body, inlet openings, outlet opening and contact chamber. It may however be possible to provide the injector with an external reinforcement, in order to adapt to the physical stresses that will be encountered when the injector is in service.

In addition, the invention also relates to an ascending flow or descending flow tubular-type reactor intended to be used in a fluid catalytic cracking unit equipped with at least one feedstock injector as has been defined above.

Advantageously, the reactor is equipped with at least two feedstock injectors as defined above, and at least one of these injectors is oriented so as to inject a liquid hydrocarbon feedstock counter-currently inside the reactor with respect to a flow direction of the stream of catalyst grains. This flow direction is generally parallel to the longitudinal axis of the reactor. In particular, the position of the feedstock injector(s) may be as described in document EP 0 911 379 or EP 0 209 442.

By way of example, said at least one injector may be positioned so as to allow the introduction of the feedstock along a direction that makes an angle of 0 to 90° with the longitudinal axis of the reactor. This angle may in particular be from 5 to 85°, or even from 30 to 60°. The injectors may thus be positioned so as to carry out an injection of the feedstock counter-currently, optionally in combination with co-current injections, which may make it possible to ensure a better result as regards conversion of hydrocarbon feedstock and quality of the desired products.

Given that it is no longer necessary to take into account the problem of erosion, the injector according to the invention may be positioned freely so as to optimize the efficiency of the FCC. Such a positioning of injectors, optionally in combination with co-current injectors, may make it possible to ensure a better result as regards conversion of hydrocarbon feedstock and quality of the desired products.

Advantageously, when the tubular reactor is made of metal, for example made of stainless steel, it may be connected to at least one injector by fastening means capable of absorbing a difference in expansion between the metal of the reactor and the ceramic material of said at least one injector.

For example, such fastening means may be formed by a layer of materials essentially comprising assembled ceramic fibres having a non-zero elastic modulus, this layer being positioned between a portion made of ceramic material and a metal portion and providing the cohesion of these portions.

Alternatively, the geometry and the dimensions of the fastening means may be adapted in order to compensate for the difference in thermal expansion between the metal and the ceramic material.

Such fastening means may comprise portions that interlock or screw together, preferably conical portions. For example, the portions to be assembled advantageously have a rotational symmetry, and their ends have complementary conical shapes.

As a variant, the fastening means may comprise one (or more) pressing element(s) capable of exerting an elastic force on a portion made of ceramic material to be assembled to a metal portion in order to press this portion made of ceramic material against the metal portion.

Thus, the fastening withstands the differential expansion between the material of the metal portion, for example a steel, preferably a stainless steel, and the ceramic material. Indeed, the ceramic may have a coefficient of thermal expansion that is much lower than that of the steel.

The pressing element may for example comprise a spring means, or other means. It might be possible, for example, to provide one or more fastening tabs that are firmly attached to (or form a single part with) a metal portion, for example that are welded. These tabs, on the one hand welded via one end to the metal portion, while the other end rests on a surface of a portion made of ceramic material, make it possible to exert an elastic bearing force on the portion made of ceramic material so as to keep this portion pressed against the metal portion. This other end may have a relatively flat surface in order to limit the zones of high mechanical stresses.

In particular, the fastening means may comprise at least one metal tab firmly attached to a fastening face of the reactor and capable of exerting an elastic bearing force on an edge of an injector in order to keep this edge elastically bearing against the fastening face of the reactor. The fastening face and the edge may extend over the entire periphery of the ends to be assembled. They may be flanges.

As a variant, the tubular reactor may also be made of ceramic material. It may then be connected to said injector by welding, brazing, screwing or interlocking, as described above.

In particular, the ceramic material may be the same as that described with reference to the injector according to the invention, the assembling by welding, brazing, screwing or interlocking may be as described with reference to the assembling of an injector made of several separate portions.

The reactor made of ceramic material may itself be made from one or more assembled portions made of ceramic material.

The invention also relates to a catalytic cracking unit comprising at least one aforementioned injector and/or at least one reactor as defined above.

The invention also relates to a fluid catalytic cracking process comprising an injection of hydrocarbon feedstock into an ascending flow or descending flow tubular-type reactor, characterized in that said injection of feedstock comprises a prior step of bringing a liquid hydrocarbon feedstock to be cracked into contact with an atomizing gas using at least one injector according to the invention, and in that said atomizing gas consists substantially of a compound that does not comprise any oxygen atoms.

Thus, steam is replaced by an atomizing gas that does not comprise any oxygen atoms. This makes it possible to reduce the formation of the oxygen-containing compounds, which are difficult to remove from the desired product.

The atomizing gas may be selected from inert gases such as nitrogen, helium and hydrogen or gases that react with olefins such as hydrogen sulphide $H_2S$. Preferably, the compound is hydrogen sulphide $H_2S$.

Preferably, the liquid hydrocarbon feedstock is injected into said reactor counter-currently with respect to a flow direction of the stream of catalyst grains. As already explained above, the flow direction is generally parallel to the longitudinal axis of the reactor. By way of example, the introduction of the feedstock along a direction makes an angle of 0 to 90° with the longitudinal axis of the reactor. This angle may in particular be from 5 to 85°, or even from 30 to 60°.

Such a counter-current injection, optionally in combination with co-current injections, may make it possible to ensure a better result as regards conversion of hydrocarbon feedstock and quality of the desired products.

Other distinctive features and advantages of the invention will emerge on reading the description given below of one particular embodiment of the invention, given by way of indication and non-limitingly, with reference to the appended drawings, in which:

FIG. 2 illustrates a schematic cross-sectional representation of an injector, the subject of the invention according to a first variant;

FIG. 3 illustrates a schematic cross-sectional representation of an injector, the subject of the invention according to a second variant;

FIGS. 4a and 4b are axial cross-sectional views of the ends of two assembled parts. The assembled parts are separated in FIG. 4b for greater clarity; and FIG. 5 shows an example of assembling an injector according to the invention to a reactor, in particular a metal reactor, FIG. 5a showing a detail from this FIG. 5.

Figure 1:
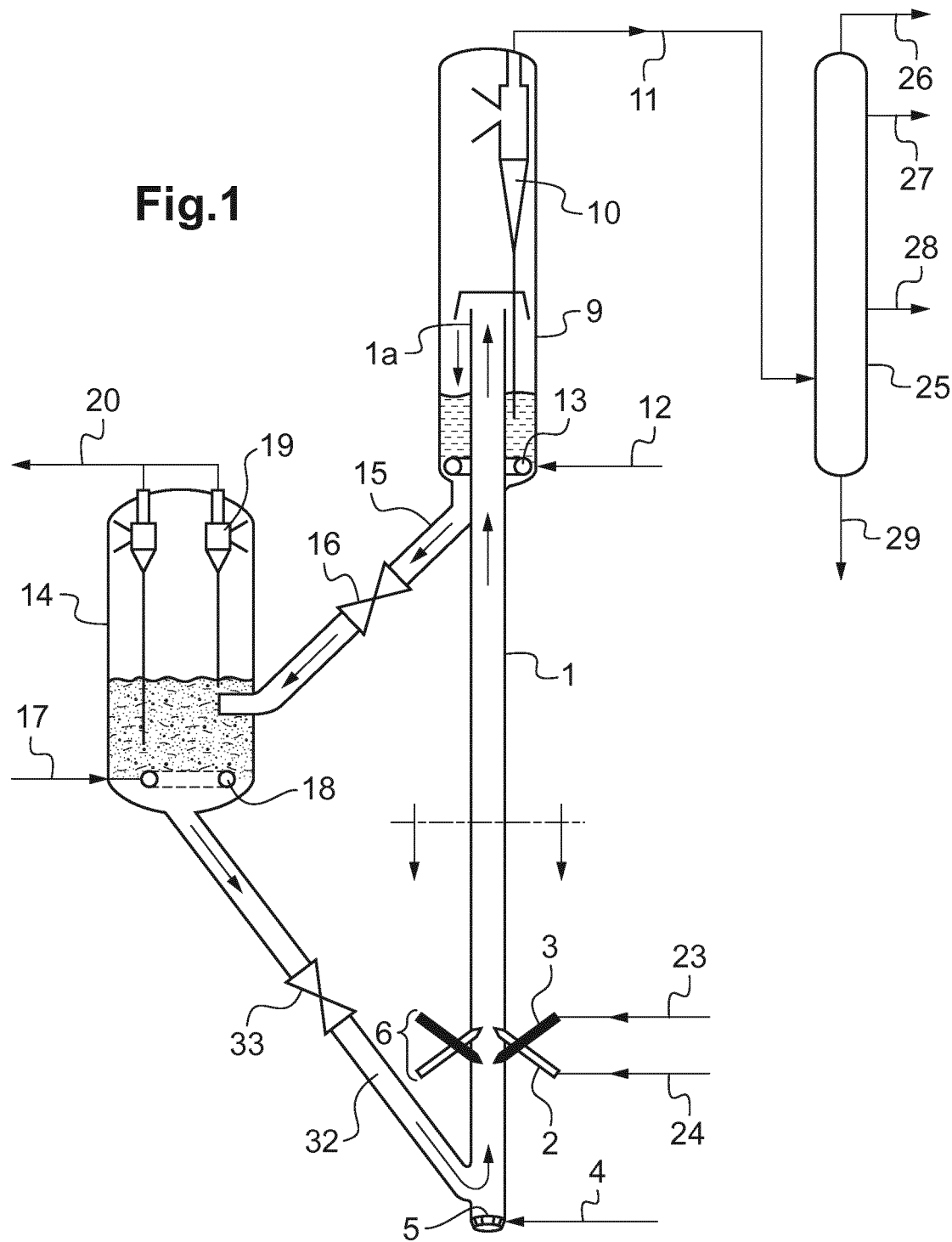
FIG. 1 illustrates a schematic representation of an FCC unit.

FIG. 1 represents a fluid catalytic cracking unit equipped with an essentially ascending flow reactor. This unit is of a type known per se. It comprises in particular a column-shaped reactor 1, referred to as a feedstock riser, or riser, supplied at its base via a duct 32 with regenerated catalyst grains in a determined amount. A riser gas, for example steam, is introduced into the column 1 through the line 4, by means of a diffuser 5.

The feedstock to be cracked is introduced at the injection zone 6, which comprises injectors 2 and 3 that will be described in detail below. The column 1 opens, at its top, into a chamber 9, referred to as a disengager, which is for example concentric with it and in which the separation of the cracking products and the stripping of the deactivated catalyst particles are carried out. The cracking products are separated from the spent catalyst particles in a cyclone 10, which is housed in the chamber 9, at the top of which a line 11 is provided for discharging the cracking products, whilst the deactivated catalyst particles move by gravity towards the base of the chamber 9. A line 12 supplies fluidizing gas injectors or diffusers 13, uniformly arranged at the base of the chamber 9, with stripping fluid, generally steam. One or more other cyclones may be provided inside the chamber 9.

The deactivated catalyst particles thus stripped are discharged at the base of the chamber 9 to a regenerator 14, through a duct 15, on which a control valve 16 is provided. In the regenerator 14, the coke deposited on the catalyst particles is burnt using air, injected at the base of the regenerator via a line 17, which supplies uniformly spaced injectors or diffusers 18. The treated catalyst particles, entrained by the flue gas, are separated by cyclones 19, from where the flue gas is discharged through a line 20, whilst the catalyst particles are discharged to the base of the regenerator 14, from where they are recycled to the feed of the riser 1 via the duct 32, equipped with a control valve 33.

The reaction effluents are transported via the line 11 to a fractionating column 25, which makes it possible to separate them by distillation, in order to obtain:

through the line 26, the gaseous products (C1 to C4 hydrocarbons);
through the line 27, a petrol cut;
through the line 28, a diesel or LCO cut;
and finally, through the line 29, a distillation residue or slurry cut, which contains significant amounts of fine particles.

The ceramic injectors 2, 3 according to the invention may be installed, for example, in the lower portion of the riser 1.

FIG. 2 schematically represents an injector according to a first embodiment of the invention. The injector 2' is an injector commonly referred to as a "Venturi" type injector, having a hollow cylindrical body 41. The injector 2' has a first opening 40 and a second opening 42, each opening into a contact chamber 46 arranged inside the cylindrical body 41. The injector 2' additionally has an outlet opening 44 that opens into the reactor 1 (not presented in FIG. 2).

The contact chamber 46 has a first introduction chamber 47 and a second outlet chamber 49, which communicate with one another via a neck 48 having a diameter substantially smaller than that of the first and second chambers 47, 49.

The first opening 40 and the second opening 42 are respectively provided for injecting the liquid hydrocarbon feedstock to be cracked, and for injecting an atomizing gas into the injector. In this case, the atomizing gas may be steam but may be replaced by another gas, for example hydrogen sulphide $H_2S$, hydrogen $H_2$ or refinery gas.

A refinery gas generally contains C1 to C5 hydrocarbons, hydrogen, and sometimes $H_2S$.

When the liquid hydrocarbon feedstock C is introduced through the first opening 40, the liquid is guided by a path 50 that opens into the first chamber 47. At the same time, the atomizing gas G introduced through the second opening 42 reaches the first chamber 47 in order to be mixed with the liquid hydrocarbon feedstock. Next, the mixture of the atomizing gas and of the hydrocarbon liquid reaches sonic velocities at the neck 48 owing to the Venturi effect. The increase in the velocity and the shear caused by the atomizing gas cause the jet of liquid hydrocarbon feedstock to break up into fine droplets.

The injector 2' may be sized in order to operate with a stream of liquid at the neck of the order of 5000 $kg/m^2s$. The atomization of the liquid hydrocarbon feedstock essentially takes place at the neck 48.

FIG. 3 schematically represents an injector according to a second embodiment of the invention. The injector 2" is an injector commonly referred to as an "impactor" type injector, which also has a hollow cylindrical body 141, arranged in which is a contact chamber 146. Structurally, the impactor type injector 2" differs from that of Venturi type by the fact that:

the contact chamber 146 has a substantially constant internal diameter, that is to say that it does not have a neck; and
the injector 2" has a target 143 that juts out from an inner wall 145 of the contact chamber 146 opposite the opening 142 for introducing the atomizing gas G and through the passage of the liquid hydrocarbon feedstock C.

The liquid hydrocarbon feedstock C is projected against the target 143, as soon as it enters the contact chamber 146 through a first opening 140. The jet of liquid breaks up and is carried in the form of droplets by a stream of atomizing gas G introduced through a second opening 142 at high speed. The atomization of the liquid hydrocarbon feedstock in this type of injector 2" is carried out in two parts. A first part takes place at the target 143 via a breakup of the jet of liquid hydrocarbon feedstock. The second atomization takes place at an outlet opening 144 of reduced diameter, where the narrowing of the diameter accelerates the fluids. By way of example, the outlet opening 144 has a diameter of the order of 18 to 23 mm.

According to the invention, the injectors 2', 2" are formed entirely from a ceramic material, preferably from silicon carbide SiC. They are for example formed by injection moulding or extrusion. Injection moulding or extrusion are conventionally carried out using ceramic powders or precursors of ceramics with a binder. According to another manufacturing method, the ceramic injectors are formed by compression and heating of a ceramic powder, it being possible for the compression to be maintained during the heating step, the heating step being a step of sintering the ceramic powder. This technique is particularly well suited to the manufacture of solid elements made of silicon carbide according to the invention. The ceramic powder used optionally comprises ceramic fibres in order to increase the mechanical strength of the parts produced. The ceramic fibres, when they are present, generally represent from 0.1% to 10% by weight of the part produced.

According to the invention, the injector 2 is made from one or more parts made of ceramic material. For example, the hollow cylindrical body 41, 141 and the second inlet opening 42, 142 may be separate parts, it being possible for the hollow cylindrical body 41, 141 and the first inlet opening 40, 140 to be made from a single part.

The elements 41 and 42 may then be interlocked, as represented schematically in FIG. 4a by interlocking of conical end portions of complementary shape, or assembled by screwing of their ends (FIG. 4b), or else welded or brazed (not represented). Similarly, the hollow cylindrical body 41, 141 may consist of several separate portions that are assembled, it being possible for this assembling to be carried out as described above, by assembling cylindrical or conical sections, or else by assembling parts resembling bricks by interlocking and/or welding/brazing.

The injector 2 may be connected directly to an outer wall 1a of the tubular reactor 1 as represented schematically in FIG. 5. When the tubular reactor 1 is made of metal, its outer wall 1a may have a fastening face 1b, firmly attached to which are at least two metal tabs 1c shaped in order to bear against an edge 2c of the injector 2 in order to keep this edge 2c bearing against the fastening face 1b of the reactor. This edge 2c may be located at one end of the injector 2. The fastening face 1b and the edge 2c may extend over the entire periphery of the ends to be assembled. They may be flanges.

As a variant that is not represented, the reactor may also be made of ceramic material and the fastening to the injector may then be carried out as described above for the assembling of the elements of the injector.

The invention has been described with reference to an FCC unit operating with a riser reactor, the injectors according to the invention may however also be used in FCC units operating with a downer reactor.

The invention claimed is:

1. A fluid catalytic cracking process comprising:
    injecting a hydrocarbon feedstock into a riser or downer tubular-type reactor, the riser or downer tubular-type reactor being part of fluid catalytic cracking unit, wherein the injecting of the hydrocarbon feedstock comprises bringing a liquid hydrocarbon feedstock to be cracked into contact with an atomizing gas in order to atomize the liquid hydrocarbon feedstock using at least one feedstock injector comprising:
        at least one hollow cylindrical body;
        at least a first and a second inlet openings for respectively injecting a liquid hydrocarbon feedstock to be cracked and an atomizing gas into the cylindrical body;
        at least one contact chamber arranged inside the hollow cylindrical body, in which the liquid hydrocarbon feedstock to be cracked and the atomizing gas are intended to be brought into contact in order to atomize the liquid hydrocarbon feedstock to be cracked; and
        at least one outlet opening that opens on the inside of the reactor in order to eject the liquid hydrocarbon feedstock thus atomized,
    characterized in that each element of the injector is formed of a ceramic material, and the ceramic material comprises a ceramic matrix selected from silicon carbide SiC, boron carbide $B_4C$, silicon nitride $Si_3N_4$, aluminium nitride AlN, boron nitride BN, alumina $Al_2O_3$, or mixtures thereof, incorporated in which ceramic matrix are carbon fibres or ceramic fibres; and
    in that the atomizing gas consists of a compound that does not comprise any oxygen atoms.

2. The fluid catalytic cracking process according to claim 1, characterized in that the compound is hydrogen sulphide $H_2S$.

3. The fluid catalytic cracking process according to claim 1, characterized in that the liquid hydrocarbon feedstock is injected into the reactor counter-currently with respect to a flow direction of the stream of catalyst grains.

4. The fluid catalytic cracking process according to claim 1, wherein the feedstock injector comprises ceramic fibres selected from crystalline alumina fibres, mullite fibres, crystalline or amorphous silicon carbide fibres, zirconia fibres, silica-alumina fibres, or mixtures thereof.

5. The fluid catalytic cracking process according to claim 1, wherein the feedstock injector comprises a ceramic material which is a sintered ceramic material.

6. The fluid catalytic cracking process according to claim 1, wherein the feedstock injector comprises a ceramic material which is a Ceramic Matrix Composite named CMC.

7. The fluid catalytic cracking process according to claim 1, wherein the feedstock injector is formed as one part.

8. The fluid catalytic cracking process according to claim 1, wherein the riser or downer tubular-type reactor for use in a fluid catalytic cracking unit comprises the at least one feedstock injector.

9. The fluid catalytic cracking process according to claim 1, wherein the riser or downer tubular-type reactor is equipped with at least two feedstock injectors, and in that at least one of the injectors is oriented so as to inject a liquid hydrocarbon feedstock counter currently inside the reactor with respect to a flow direction of the stream of catalyst grains.

10. The fluid catalytic cracking process according to claim 1, wherein the riser or downer tubular-type reactor is made of metal, and in that the injector is connected to the reactor by fastening means capable of absorbing a difference in expansion between the metal of the reactor and the ceramic material of the injector.

11. The fluid catalytic cracking process according to claim 1, wherein the riser or downer tubular-type reactor is made of ceramic material and in that the injector is connected to the reactor by welding, brazing, screwing or interlocking.

* * * * *